(12) United States Patent
Hellwig et al.

(10) Patent No.: US 6,503,981 B2
(45) Date of Patent: Jan. 7, 2003

(54) POLYURETHANE BASED THERMOREACTIVE HOT-MELT ADHESIVES

(75) Inventors: Silke Hellwig, Wuppertal (DE); Olaf Kleineberg, Hagen (DE); Heinz-Peter Pfeiffer, Wuppertal (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/747,640

(22) Filed: Dec. 22, 2000

(65) Prior Publication Data

US 2002/0120088 A1 Aug. 29, 2002

(51) Int. Cl.$^7$ .............................. C08J 3/00; C08K 3/20; C08L 75/00; C08G 18/00; C08G 18/81
(52) U.S. Cl. ..................... 524/589; 524/590; 528/44; 528/45; 528/61; 528/80; 528/85
(58) Field of Search ................................ 524/590, 589; 528/85, 44, 45, 80, 61

(56) References Cited

U.S. PATENT DOCUMENTS 4,647,646 A  *  3/1987  Hardy et al.
5,019,638 A     5/1991  Muller et al.
5,077,339 A    12/1991  Grogler et al.
5,166,302 A    11/1992  Werner et al.

FOREIGN PATENT DOCUMENTS

EP      0 455 400 B1    8/1995

* cited by examiner

*Primary Examiner*—Patrick D. Niland
(74) *Attorney, Agent, or Firm*—Steven C. Benjamin

(57) ABSTRACT

A thermally curable hot-melt adhesive composition, comprises (A) a prepolymer having isocyanate groups, a number average molecular mass $M_n$ of 700 to 6000 and wherein 50 to 100%, preferably 70–95%, of the reactive isocyanate groups of the prepolymer are blocked, the prepolymer being the reaction product of one or more at least semi-crystalline straight-chain polyesters; one or more amorphous or liquid straight-chain polyesters, optionally one or more polyethers, and one or more diisocyanates; and (B) at least one reactive component selected from the group consisting of diamines, epoxide adducts of diamines, and polyalcohols.

9 Claims, 1 Drawing Sheet

POLYURETHANE BASED THERMOREACTIVE HOT-MELT ADHESIVES

BACKGROUND OF THE INVENTION

The invention relates to thermoreactive hot-melt adhesives and, in particular, to polyurethane-based thermoreactive hot melt adhesives.

Polyurethane adhesives (PUR-hot-melt adhesives) of prepolymers based on polyadipic acid derivatives or polyglycol derivatives and polyisocyanates are known, for example from EP-B-455 400. These PUR-hot-melt adhesives are used for the bonding of synthetic materials, glass, metal, leather or wood and cure irreversibly within a few days, due to the effect of the humidity in the air or in the materials being adhered. The PUR-hot-melt adhesives provide a bond that has good heat stability and resistance against chemicals. The solidification times (i.e., setting times) of the PUR-hot-melt adhesives may be adjusted to a range from seconds to minutes, and low melting viscosities and a fast solidification, and a good cold-elasticity can be achieved after the application. See, for example, DE-A-38 27 224, DE-A-41 14 220, EP-A-0 354 527.

A drawback of these products is the storage capability, as traces of water during the preparation or the storage of the adhesives may already lead to a rise in viscosity and to a premature curing and thus to failure times or faulty adhesion due to obstructed lines and nozzles of the application devices. An additional drawback is the gas evolution of carbon dioxide during the reaction with water to polyurea, whereby the adhesive could foam and alter the desired position of the joining parts.

Polyurethane adhesives that can be thermally activated, based on prepolymers and blocked isocyanate groups, are also known. When the temperature rises, first the isocyanate groups are set free and then, by an additional effect of humidity on the reactive isocyanate groups, the cross-linking reaction takes place and thus the adhesion process. The parts to be adhered have to present a sufficient humidity concentration, such that adhesions of impervious materials are hardly possible.

EP-A 0 431 413 describes a thermally curable PUR-powder based on polyurethane with encapsulated isocyanates, whereby the de-activation of the isocyanate groups is not brought about by capping, but by a blocking layer on the surface of the particle. Particulate materials are used as components in the formulation. In order to generate powder-shaped products, it is necessary to add the reaction mixture as a melt to an inert solvent/emulsifier system.

SUMMARY OF THE INVENTION

In its broadest sense, the invention provides a thermally curable hot-melt adhesive composition, comprising
  (A) a prepolymer having isocyanate groups, a number average molecular mass $M_n$ of 700 to 6000 and wherein 50 to 100% of the reactive isocyanate groups of the prepolymer are blocked, said prepolymer being the reaction product of
    (1) at least one straight-chain polyester which is at least semi-crystalline with
    (2) at least one straight-chain polyester selected from the group consisting of amorphous polyesters and liquid polyesters,
    (3) optionally at least one polyether, and
    (4) at least one diisocyanate; and
  (B) at least one reactive component selected from the group consisting of diamines, epoxide adducts of diamines, and polyalcohols.

The hot-melt adhesive composition of this invention does not have the above-mentioned drawbacks, but do have a high resistance against humidity and a high storage capability, in particular when the joining parts are precoated with the adhesive and if the actual pasting is carried out later.

DETAILED DESCRIPTION OF THE INVENTION

Figure 1:
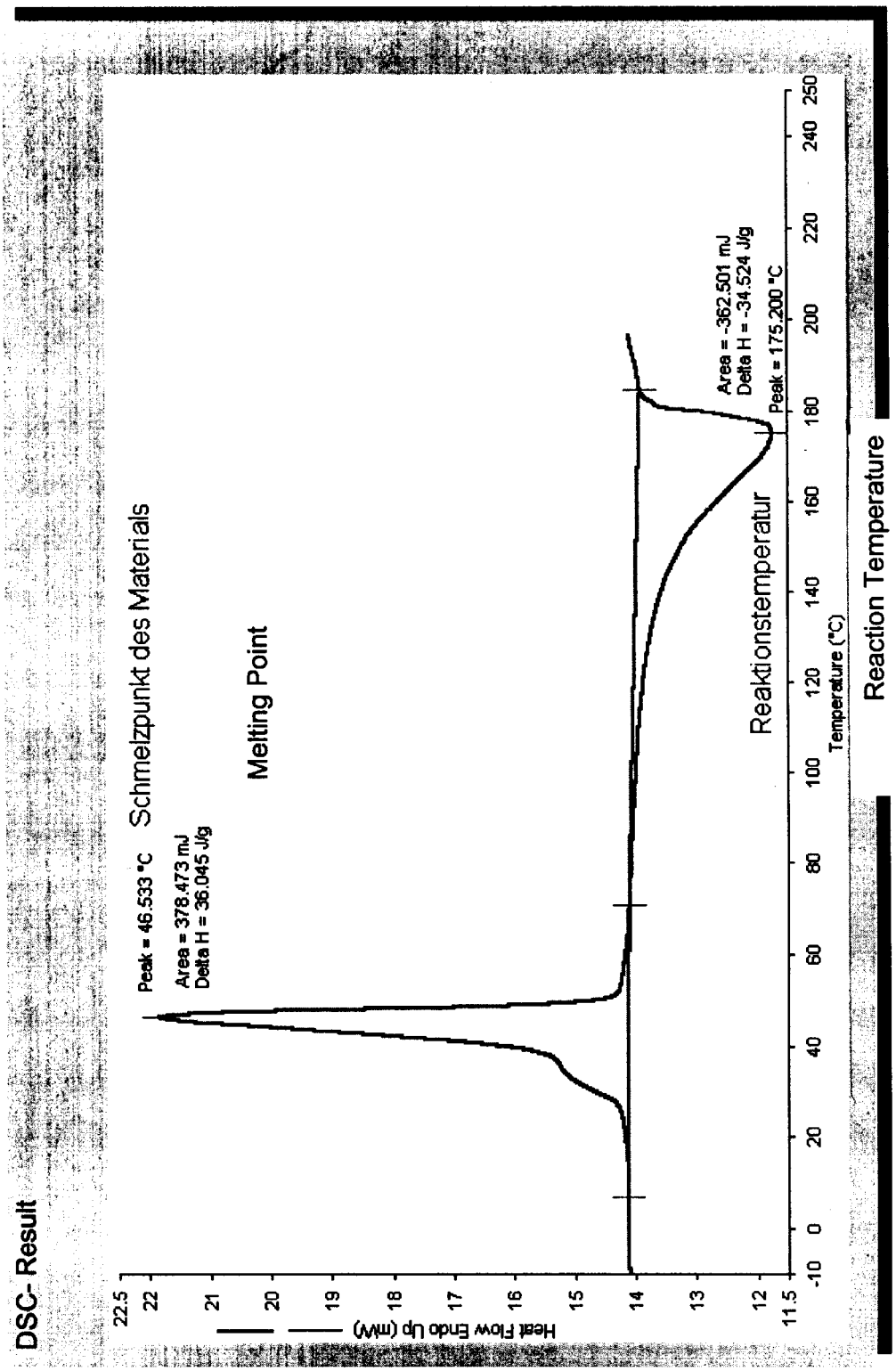
FIG. 1 is a graph of heat flow vs. temperature, determined by Differential Scanning Colorimetry mmeasurement of the adhesive composition produced according to Example 4.

The prepolymer A contained in the hot-melt adhesive composition according to the invention is based on polyurethanes, prepared from semi-crystalline and amorphous and/or liquid polyesters with or without polyethers.

The prepolymer A can in particular be obtained from the following mixtures of polyesters and optionally polyethers, whereby the percentage are based on the total weight of the polyester/polyether mixture:

(1) 25 to 55 wt-% of one or more at least semi-crystalline straight-chain polyesters,
  (2) 1 to 45 wt-%, preferably 15 to 20 wt-%, of one or more amorphous and/or liquid straight-chain polyesters and
  (3) 0 to 40 wt-% of one or more polyethers.

The polyesters are hydroxy-functional and have for example hydroxyl values from 15 to 150 mg KOH/g. The polyethers, if present, are also hydroxy-functional and preferably have a hydroxyl value from 50 to 400.

Semi-crystalline or crystalline polyesters (designated here as at least semi-crystalline polyesters) are known to the person skilled in the art and are prepared from aliphatic dicarboxylic acids and diols having short chains with an even number of carbon atoms, for example according to EP-A-0 354 527.

Examples of suitable straight-chain, at least semi-crystalline polyesters are products of aliphatic dicarboxylic acids and/or the derivatives thereof, such as, for example, adipic acid, sebacic acid, dodecanoic acid and the derivatives thereof. Diols having short chains have for example up to 10 carbon atoms. Examples of suitable diols having short chains and an even number of carbon atoms are ethylene glycol, butanediol-1,4 or hexanediol-1,6. Polycaprolactones are also included when we mention straight-chain, at least semi-crystalline polyesters. Adipic acid and adipic acid derivatives, as well as ethylene glycol and butanediol-1,4 are used in preference.

Apart from the straight-chain, semi-crystalline polyesters, amorphous and/or liquid polyesters are also used in the preparation of component A. These polyesters can be obtained by reacting aliphatic, cycloaliphatic and/or aromatic dicarboxylic acids or the derivatives thereof, for example, sebacic acid, dodecanoic acid, phthalic acid, isophthalic acid and/or derivatives thereof, as well as diols. Examples of diols are diols having short chains such as ethylene glycol, diethylene glycol, triethylene glycol, propanediol-1,2 or propanediol-1,3, butanediol-1,2 or butanediol-1,4, neopentyl glycol, hexanediol-1,6, dipropylene glycol and tripropylene glycol.

Polyethers may also be used in the preparation of the prepolymer component A that is used according to the invention. These are, for example, polyethylene glycol, polypropylene glycol or polytetramethylene glycol and also polypropylene glycols modified with ethylene oxide or mixtures thereof. Such polyethers may for example have number average molecular masses Mn from 400 to 2000.

The polyesters suitable for use according to the invention can be prepared in conventional manner by transesterification of the acid component with the diol component, for example under nitrogenous conditions, for example at temperatures between 140 and 260° C., with or without using conventional transesterification catalysts.

Diisocyanates conventionally used in polyurethane chemistry can be used as the diisocyanates. These include, for example, hexamethylene diisocyanate, isophorone diisocyanate, 2,4-(2,6)-toluylene diisocyanate, dicyclohexyl diisocyanate, 4,4-diphenylmethane diisocyanate (MDI). Derivatives of MDI, such as isomers, homologs or prepolymers, such as, for example, Desmodur PF®, can also be used. 4,4-diphenylmethane diisocyanate is used in preference.

Blocking of the isocyanates can be achieved by conventional means, for example with butyl glycol, butanone oxime, phenol, ethanoic acid ester, malonic acid ester, dimethyl pyrazole or caprolactame. While caprolactame is used in preference, combinations from several of the mentioned compounds are also possible.

The prepolymer of component A can further be prepared by also using chain elongation substances. As chain elongation substances the diols having short chains that are conventionally used for this purpose can be used, such as ethylene glycol, diethylene glycol, triethylene glycol, propanediol-1,2 or propanediol-1,3, butanediol-1,2 or butanediol-1,4, neopentyl glycol, hexanediol-1,6, dipropylene glycol or tripropylene glycol. Butanediol-1,4 and hexanediol-1,6 are used in preference.

Prepolymer A can also contain other resins or additives. As resins, prepolymer A can contain, for example, resins that are not reactive towards isocyanate, such as polyvinyl acetate, polyvinyl chloride or copolymerisates of ethylenically unsaturated compounds. As additives, one can mention those conventionally used in polyurethane chemistry, such as, for example, catalysts and accelerators, for example bismuth compounds, dibutyl tin laurate or tertiary amines. Further examples are light protecting agents, fillers such as barium sulfate, pyrogenous silicic acid, ground minerals or talcum, and pigments for dyeing the adhesive for specific applications such as, for example, carbon black or iron oxides, and metallic powder and/or metallic chips.

The equivalent weight ratio of diol to diisocyanate is preferably between 1:1 and 1:3.

Component B comprises one or more diamines, such as are used for example for curing epoxide adhesives. Aliphatic, cycloaliphatic, araliphatic or aromatic diamines, such as, for example, ethylene diamine, hexamethylene diamine, isophorone diamine, aminomethyl benzylamine, triethoxysilyl propylamine, triethoxisilyl aminoethyl propylamine, derivatives of dicyclohexyl methane diamine (Laromin C 260®), amino-functional polypropylene glycols (Jeffamin®), amino-functional polyamides and/or epoxide adducts, may be used.

Component B can also consist of polyalcohols, such as, for example glycerin, trimethylolpropane, hexanediol-1,6, decanediol-1,10, polyethers or polyester alcohols, ricinoleic oil or polyols based on hydrated dimeric fatty acids.

The mixing ratio of components A and B results from the total content of isocyanate (free and capped) of component A and of the titratable amine content of component B. The equivalent weight ratio of isocyanate to amine in the composition according to the invention is for example from 1:1 to 1:5, preferably 1:2.5.

Because the mixture generally has a melting range from 40 to 80° C. and a reaction temperature between 140 and 300° C., it can be prepared in a conventional stirring vessel. For this purpose, the composing parts of component A can be first heated together, for example in a heatable kneading device, and then be mixed with component B. It is however also possible to manipulate both components separately and to mix them directly before the application to the joining parts. It is possible to mix for example in a static mixer or mixing tube, such as in the case of the application of two-component adhesives of the prior art.

The viscosity of the finished hot-melt-type adhesives without fillers or pigments is preferably between 800 and 12000 mPa.s, in particular preferably between 800 and 9000 mPa.s, at 100° C.

The adhesive according to the invention can be applied as a melt on one side or on the two sides of the pieces to be adhered. For this purpose, the adhesive is heated only to a temperature at which both components A and B do not react with each other. The temperature is in this case for example in the range from 40 to 90° C., preferably from 50 to 70° C.

After the adhesive has been applied to the pieces to be adhered, the latter can be prepolymerised by heating for example from 140 to 220° C. during a time period of 3 to 30 seconds (e.g. for 30 seconds at 140° C. or 3 seconds at 220° C.), in order to reduce the reaction time in the subsequent curing. The joining parts coated with the adhesive agent in this manner can be stored for months. The prepolymerisation can however also be carried out directly before the use.

At the time that the adhesion of the pre-coated pieces is desired, the parts are positioned in the desired orientation and the adhesive is melted by heating, for example at a temperature in the range from 170 to 300° C., preferably from 210 to 280° C., during a time period of 3 to 30 seconds, preferably 3 to 10 seconds. During this time, a chemical cross-linking reaction takes place. After cooling of the adhesive, the pieces are securely adhered to one another and the adhesive can no longer be melted.

The adhesive according to the invention can also be brought to reaction by temperature increase, i.e., to paste and cure, without any intermediate storage of the joining parts that are coated with the adhesive, i.e., directly after the application.

The melting or the pasting and curing of the adhesive can for example be carried out by hot air or by infrared, near infrared (NIR) or microwave radiation or with high frequencies.

The melting or the pasting and curing is preferably carried out by means of NIR-irradiation, for example for a time period of 3 to 10 seconds.

The cross-linking reaction accompanying the melting or the pasting and curing of the adhesive takes place rapidly, such that, after a time period of a few seconds, for example 3 to 10 seconds, up to a maximum of 30 seconds, depending on the type of melting, extensive curing of the adhesive agent takes place.

The adhesive composition according to the invention can be used to paste most diverse materials together or with each other. These can for example be materials of metal, synthetics, glass, wood, leather and textile materials. In particular, these can for example be metallic or synthetic pins or notches or threaded portions, which can for example be pasted according to the invention onto automotive parts and can serve for example for fixing mountings, for use in e.g. hose couplings and similar devices.

The invention further provides, therefore, a process for pasting substrates, wherein the hot-melt adhesive composition according to the invention is applied at least to one substrate that is to be pasted and wherein the hot-melt adhesive composition melts directly before use, preferably by means of NIR-irradiation.

According to a preferred embodiment, the substrates to be pasted have to undergo an intermediate storage step after the hot-melt adhesive composition has been applied.

The invention further provides the use of the hot-melt adhesive composition according to the invention for coating substrates that are to be pasted or for pasting substrates.

The adhesive composition according to the invention makes it possible to store the joining parts that have been coated with the adhesive for months, before the actual pasting of the parts takes place. Due to the resistance towards water and humidity, a premature cross-linking reaction, and thus a premature curing of the adhesive, does not take place in spite of the long storage period. In this way, an impairment of the ulterior pasting by faulty pastings can be avoided. Furthermore, in the preparation of the adhesive composition, obstructions of the application devices caused by premature curing, and the ensuing failure times, do not take place. Furthermore foaming of the adhesive by the generation of carbon dioxide by the reaction with water and thus a change of position or a partial separation of the pasted parts is avoided.

The invention will be explained by means of the following Examples.

EXAMPLES

Example 1

Preparation of a Semi-crystalline Polyester 2496.4 g adipic acid (19.2 mol), 2120.7 g 1,6-hexanediol (20.2 mol) and 1.1 g monobutyl tin dioxide (Fascat 4100) are melted in a 5 l glass vessel equipped with a column and a distillation apparatus. From the onset of the reaction (about 140° C.), the temperature is slowly increased to 250° C., such that the temperature at the top of the column does not exceed 100° C. After reaching an acid value of 10 mg KOH/g, vacuum is applied (<300 mbar) and condensation to an acid value of <3 mg KOH/g takes place. Thereafter, cooling under nitrogen takes place.

| hydroxyl value | 25 mg KOH/g |
|---|---|
| molar weight (Mn) | 4500 g/mol |

Example 2

Preparation of a Liquid or Amorphous Polyester 248 g ethylene glycol (4 mol), 170.6 g diethylene glycol (1.6 mol), 97 g neopentyl glycol (0.93 mol), 85.2 g 1,6-hexanediol (0.72 mol), 421.5 g adipic acid (2.89 mol) and 479.3 g isophthalic acid (2.89 mol) are brought to reaction as described in Example 1. After reaching an acid value of 13, vacuum is applied and condensation to an acid value of <4 mg KOH/g takes place.

| hydroxyl value | 87 mg KOH/g |
|---|---|
| molar weight Mn | 1300 g/mol |

Example 3

Preparation of a Liquid or Amorphous Polyester 176.7 g ethylene glycol (2.80 mol), 452.8 g neopentyl glycol (4.35 mol), 586.5 g hexanediol-1,6 (4.90 mol), 3.8 g monobutyl tin oxide (Fascat 4100) and 964.6 g dimethyl terephthalate (4.90 mol) are melted in a 5 l glass vessel equipped with a column and a distillation apparatus. From the onset of the distillation (135° C.), the temperature is slowly increased to 205° C., such that the temperature at the top of the column does not exceed 66° C. When the temperature at the top of the column drops, the batch is cooled to 140° C. and 376.0 g adipic acid (2.49 mol) and 1020.0 g isophthalic acid (6.10 mol) are charged. The batch is slowly heated to 250° C. Here, a temperature of 102° C. at the top of the column must not be exceeded. The latter must be kept at 250° C. until all the isophthalic acid is dissolved. Thereafter, application of vacuum and condensation to a viscosity from 2000 to 2500 mPa.s (60% in xylene).

Example 4

Preparation of a Hot-melt Adhesive 231.6 g 4,4-diphenylmethane diisocyanate (0.85 mol) are melted in a dry 2 l flask under nitrogen for the preparation of component A. Then, 377.5 g (0.08 mol) polyester from Example 1, 227.4 g polytetrahydrofurane 1000 (0.23 mol), 17 g polyester from Example 2 (0.013 mol) and 11 g 1,4-butanediol are added stepwise while observing the exothermic reaction and the batch is heated to 80° C. After stirring for four hours at 80° C. under nitrogen, a NCO-value of 3.6% is reached. Thereafter 85 g caprolactame are added stepwise while observing the exothermic reaction. After three hours, a NCO-value of less than 0.2% is reached. 69.6 g isophorone diamine (0.41 mol) are added as the component B.

melting viscosity 1500 mPa.s (100° C.)

The hot-melt-type adhesive from Example 4, when exposed to temperature, present a behaviour with respect to the melting and reaction temperature as shown in the appended FIG. 1.

Example 5

Preparation of a Hot-melt Adhesive 90.4 g 4,4'-diphenylmethane diisocyanate (0.36 mol), 300.8 g (0.06 mol) of the polyester from Example 1, 28.2 g (0.02 mol) of the polyester from Example 2 and 180.5 g (0.03 mol) of the polyester from Example 3 are brought to reaction in a 2 l flask according to Example 4 at 90° C. for the preparation of component A. If the NCO-value is smaller than 3.4%, 56.5 g (0.5 mol) caprolactame are added stepwise while observing the exothermic reaction. After three hours a NCO-value of less than 0.2% is reached. 42.5 g isophorone diamine are added as the component B.

melting viscosity 40 Pa.s (100° C.)

The hot-melt adhesives according to the invention thus, due to their composition, enable the processing of the melting and curing according to the invention.

What is claimed is:

1. A thermally curable hot-melt adhesive composition, comprising
   (A) a prepolymer having isocyanate groups, a number average molecular mass Mn of 700 to 6000 and wherein 50 to 100% of the reactive isocyanate groups of the prepolymer are blocked, said prepolymer being the reaction product of
      (1) 25 to 55 wt-% of at least one straight-chain polyester, said polyester being at least semi-crystalline,
      (2) 1 to 45 wt-% of at least one straight-chain polyester selected from the group consisting of amorphous polyesters and liquid polyesters,
      (3) 0 to 40 wt-% of at least one polyether, and
      (4) at least one diisocyanate; and
   (B) at least one reactive component selected from the group consisting of diamines, epoxide adducts of diamines, and polyalcohols;
   wherein the weight percentages are based on the combined weight of the polyesters and polyethers.

2. The adhesive of claim 1 wherein prepolymer A is obtained by reacting in admixture with at least one polyether.

3. The adhesive of claim 2 wherein the polyethers of prepolymer A are selected from the group consisting of polyethylene glycol, polypropylene glycol, polytetramethylene glycol and polypropylene glycol modified with ethylene oxide.

4. The adhesive of claim 1 wherein prepolymer A is obtained from a reaction mixture comprising
   (1) 25 to 55 wt-% of at least one straight-chain polyester, said polyester being at least semi-crystalline,
   (2) 15 to 20 wt-% of at least one straight-chain polyester selected from the group consisting of amorphous polyesters and liquid polyesters,
   (3) 0 to 40 wt-% of at least one polyether, and
   (4) at least one diisocyanate;
   wherein the weight percentages are based on the combined weight of the polyesters and polyethers.

5. The adhesive of claim 1 wherein the semi-crystalline straight-chain polyesters are prepared from dicarboxylic acids selected from the group consisting of adipic acid and adipic acid derivatives, and polyols selected from the group consisting of ethylene glycol and butanediol-1,4.

6. The adhesive of claim 1, wherein the amorphous and liquid polyesters are prepared by reacting aliphatic, cycloaliphatic or aromatic dicarboxylic acids and the derivatives thereof, with diols.

7. The adhesive of claim 1, wherein component B is selected from the group consisting of aliphatic, cycloaliphatic, araliphatic, and aromatic diamines; derivatives of dicyclohexyl methane diamine; amino-functional polypropylene glycols; glycerin; trimethylolpropane; hexanediol-1,6; decanediol-1,10; polyether alcohols; polyester alcohols; ricinoleic oil; and polyols based on hydrated dimeric fatty acids.

8. The adhesive of claim 1, wherein the equivalent weight ratio of isocyanate to amine in the adhesive composition is from 1:1 to 1:5.

9. The adhesive of claim 1, wherein the equivalent ratio of diol to diisocyanate is from 1:1 to 1:3.

* * * * *

(12) EX PARTE REEXAMINATION CERTIFICATE (5559th)
United States Patent
Hellwig et al.

(10) Number: US 6,503,981 C1
(45) Certificate Issued: Oct. 10, 2006

(54) POLYURETHANE BASED THERMOREACTIVE HOT-MELT ADHESIVES

(75) Inventors: Silke Hellwig, Wuppertal (DE); Olaf Kleineberg, Hagen (DE); Heinz-Peter Pfeiffer, Wuppertal (DE)

(73) Assignee: E.I. du Pont de Nemours and Company, Wilmington, DE (US)

Reexamination Request:
No. 90/007,018, Apr. 26, 2004

Reexamination Certificate for:
Patent No.: 6,503,981
Issued: Jan. 7, 2003
Appl. No.: 09/747,640
Filed: Dec. 22, 2000

(51) Int. Cl.
*C08J 3/00* (2006.01)
*C08K 3/20* (2006.01)
*C08L 75/00* (2006.01)
*C08G 18/00* (2006.01)
*C08G 18/81* (2006.01)

(52) U.S. Cl. .................. 524/589; 524/590; 528/44; 528/45; 528/61; 528/80; 528/85

(58) Field of Classification Search .............. 524/589, 524/590; 528/44, 45, 61, 80, 85
See application file for complete search history.

(56) References Cited

U.S. PATENT DOCUMENTS 4,307,004 A 12/1981 Schuhmacher et al.
5,100,995 A 3/1992 Münzmay et al.
5,880,167 A * 3/1999 Krebs et al. ................. 521/155
5,932,680 A * 8/1999 Heider ........................ 528/59
6,191,212 B1 2/2001 Kube
6,221,978 B1 * 4/2001 Li et al. ...................... 525/452
6,562,933 B1 * 5/2003 Ohmori et al. .............. 528/61

FOREIGN PATENT DOCUMENTS

EP 0 419 928 A 4/1991
WO WO 92/07015 4/1992

OTHER PUBLICATIONS

EPO Search Report dated Mar. 22, 2002.

* cited by examiner

*Primary Examiner*—Callie Shosho

(57) ABSTRACT

A thermally curable holt-melt adhesive composition, comprises (A) a prepolymer having isocyanate groups, a number average molecular mass Mn of 700 to 6000 and wherein 50 to 100%, preferably 70–95%, of the reactive isocyanate groups of the prepolymer are blocked, the prepolymer being the reaction product of one or more at least semi-crystalline straight-chain polyesters; one or more amorphous or liquid straight-chain polyesters, optionally one or more polyesters, and one or more diisocyanates; and (B) at least one reactive component selected from the group consisting of diamines, epoxide adducts of diamines, and polyalcohols.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2 and 4-9 are cancelled.

Claims 1 and 3 are determined to be patentable as amended.

1. A thermally curable hot-melt adhesive composition, comprising
   (A) a prepolymer having isocyanate groups, a number average molecular mass Mn of 700 to 6000 and wherein 50 to 100% of the reactive isocyanate groups of the prepolymer are blocked, said prepolymer being the reaction product of
      (1) 25 to 55 wt-% of at least one straight-chain polyester, said polyester being at least semi-crystalline,
      (2) 1 to 45 wt-% of at least one straight-chain polyester selected from the group consisting of amorphous polyesters and liquid polyesters,
      (3) [0] *up* to 40 wt-% of at least one polyether, and
      (4) at least one diisocyanate; and
   (B) at least one reactive component selected from the group consisting of diamines, epoxide adducts of diamines, and polyalcohols;
   wherein the weight percentages are based on the combined weight of the polyesters and polyethers; *and*
   *wherein prepolymer A is obtained by reacting in admixture with at least one polyether.*

3. The adhesive of claim [2] *1* wherein the polyethers of prepolymer A are selected from the group consisting of polyethylene glycol, polypropylene glycol, polytetramethylene glycol and polypropylene glycol modified with ethylene oxide.

* * * * *